US012457256B2

(12) United States Patent
Powell et al.

(10) Patent No.: US 12,457,256 B2
(45) Date of Patent: Oct. 28, 2025

(54) INTELLIGENT REPORTING WITHIN ONLINE COMMUNITIES

(71) Applicants: Sony Interactive Entertainment America LLC, San Mateo, CA (US); SONY INTERACTIVE ENTERTAINMENT INC., Tokyo (JP)

(72) Inventors: Brielle Powell, San Mateo, CA (US); Celeste Bean, San Mateo, CA (US); Victoria Walker, San Mateo, CA (US); Olga Rudi, San Mateo, CA (US); Steven Osman, San Mateo, CA (US)

(73) Assignees: SONY INTERACTIVE ENTERTAINMENT LLC, San Mateo, CA (US); SONY INTERACTIVE ENTERTAINMENT INC., Tokyo (JP)

( * ) Notice: Subject to any disclaimer, the term of this patent is extended or adjusted under 35 U.S.C. 154(b) by 54 days.

(21) Appl. No.: 18/238,414

(22) Filed: Aug. 25, 2023

(65) Prior Publication Data
US 2025/0071157 A1    Feb. 27, 2025

(51) Int. Cl.
*G06F 3/0482*    (2013.01)
*G06F 40/169*    (2020.01)
*H04L 65/403*    (2022.01)

(52) U.S. Cl.
CPC .......... *H04L 65/403* (2013.01); *G06F 3/0482* (2013.01); *G06F 40/169* (2020.01)

(58) Field of Classification Search
CPC .................................................. G06F 3/048–05
See application file for complete search history.

(56) References Cited

U.S. PATENT DOCUMENTS

| | | | |
|---|---|---|---|
| 6,374,242 B1 * | 4/2002 | Childs ................. | G06F 40/284 |
| | | | 706/62 |
| 9,795,887 B2 * | 10/2017 | Lin ....................... | A63F 13/75 |
| 10,086,291 B1 * | 10/2018 | Wisler .................. | G06F 16/40 |
| 10,325,510 B2 * | 6/2019 | Jain ....................... | G09B 5/14 |
| 11,559,746 B1 * | 1/2023 | Caballero ............. | A63F 13/497 |
| 11,601,694 B1 * | 3/2023 | Karpman .............. | G06N 20/00 |
| 2009/0235084 A1 * | 9/2009 | Ferraro ................. | G06Q 10/10 |
| | | | 715/764 |
| 2013/0159836 A1 * | 6/2013 | Ferraro ................. | G06Q 10/00 |
| | | | 715/738 |

(Continued)

*Primary Examiner* — Daniel Rodriguez
(74) *Attorney, Agent, or Firm* — Kilpatrick Townsend & Stockton LLP

(57) ABSTRACT

Systems and methods of intelligent reporting within online communities are provided. A current communication session associated with a plurality of user device may be monitored. The current communication session may include a stream of audio-visual content generated in real-time based on interactions between the user devices. A recording trigger may be detected within the current communication session. A recording of a portion of the stream of audio-visual content may be recorded in response to the detected trigger event. The recording may be analyzed to attribute one or more sub-portions within the recording to one or more of the user devices. At least one of the sub-portions attributed to an identified one of the user devices may be determined to meet a moderation event. A report regarding the identified user device may be generated that includes the at least one sub-portion that meets the moderation event.

23 Claims, 6 Drawing Sheets

(56) References Cited

U.S. PATENT DOCUMENTS

| | | | |
|---|---|---|---|
| 2013/0316751 A1* | 11/2013 | Rao | G06Q 10/10 |
| | | | 455/517 |
| 2014/0222323 A1* | 8/2014 | Purushothaman | H04L 67/535 |
| | | | 701/117 |
| 2020/0365160 A1* | 11/2020 | Nassar | G10L 17/06 |
| 2021/0370188 A1* | 12/2021 | Thomas | A63F 13/355 |
| 2021/0402304 A1* | 12/2021 | Dorn | A63F 13/493 |
| 2022/0111297 A1* | 4/2022 | Rudi | A63F 13/85 |
| 2023/0299990 A1* | 9/2023 | Mese | G06V 40/166 |
| | | | 709/204 |
| 2024/0015346 A1* | 1/2024 | Choi | H04N 21/44008 |
| 2024/0342614 A1* | 10/2024 | Gonen | A63F 13/75 |
| 2025/0050207 A1* | 2/2025 | O'Sullivan | A63F 13/79 |
| 2025/0069157 A1* | 2/2025 | Khurana | H04L 63/306 |
| 2025/0069596 A1* | 2/2025 | Nandwana | G10L 15/26 |

* cited by examiner

INTELLIGENT REPORTING WITHIN ONLINE COMMUNITIES

BACKGROUND OF THE INVENTION

1. Field of the Invention

The present invention generally relates to online communities and communication channels. The present invention more specifically relates to intelligent reporting of undesirable behaviors on online platforms.

2. Description of the Related Art

Digital platforms allow for the creation of shared virtual environments and online communities within those virtual environments. An online community may be inclusive of a network of individuals who use devices to connect through a particular digital platform or social medium. These communities can cross a variety of demographic boundaries as to person and as to place. Online community members may communicate and engage with one another through the platform or medium as to common interests, goals, and activities. Such engagement may include direct interaction through exchanged communication and content, as well as indirect interaction through use of avatars that navigate through a virtual environment.

Digital platforms can encompass relatively static and asynchronous virtual environments such as chat rooms and electronic-mailing lists. Digital platforms can also encompass world wide web sites, discussion groups, or even the comments section relative to other forms of media (e.g., the comments section for a news article or a video on YouTube). Digital platforms that foster online communities presently encompass social media sites. Examples of popular social media sites include Facebook, Twitter, and Reddit, which—like many digital platforms and social networks—may be accessed both through a traditional web browser or through application or 'app' based services.

In addition, online communities may develop and grow based on shared interested in content, which may include interactive content such as games. Many users may enjoy playing digital content titles in social settings that allow for competitive gameplay, team gameplay, and other social interactions with other users (e.g., friends, teammates, competitors, spectators). Such social interaction—which may include text-based, voice, or video chat—may take place on one or more different platforms (e.g., game platform server, lobby server, chat server, other service provider), as well as within the virtual environment of the interactive content title. Thus, the users in the same interactive session may have different options for communicating with each other, as well as interacting with the virtual environment. Such communications may not only enhance success in gameplay, but enhances social relationships and enjoyment of the interactive content title as well.

User engagement and interaction is critical to the success of an online community and digital platforms in general. The engagement and interaction can include comments, ratings, contribution of original content (e.g., written, graphical), interactive content, etc. Such online social interaction engages users by allowing them to contribute and discuss content, strengthening their sense of ownership and loyalty. While most users tend to be civil, others may engage in antisocial behavior, negatively affecting other users and harming the community. Such undesired behavior, which includes trolling, flaming, bullying, and harassment, is exacerbated by the fact that people tend to be less inhibited in their online interactions. Many platforms implement mechanisms designed to discourage antisocial behavior. These include community moderation, up- and down-voting, the ability to report posts, mute functionality, and more drastically, completely blocking users' ability to post. Such moderation tools may rely, however, on community members to report violations.

Whereas some online communities may communicate asynchronously (e.g., through written posts), other online communities may interact within a virtual environment in real-time (e.g., during a digital game). Real-time interactions may be difficult to monitor and report in real-time, and in some situations, may require extensive context in order to understand why certain behaviors (e.g., age or culturally inappropriate language) may negatively affect others within the community. Users may lack the time and inclination to undertake the effort of compiling reports that include the requisite evidence and context necessary for a human or computer-based moderator to take action. As a result, repeat offenders and certain levels of undesirable behaviors may persist within an online community until a report is made or certain numbers or levels of reports are made.

There is, therefore, a need in the art for improved system and methods of intelligent reporting within online communities.

SUMMARY OF THE CLAIMED INVENTION

Embodiments of the present invention include systems and methods of intelligent reporting within online communities. A current communication session associated with a plurality of user device may be monitored. The current communication session may include a stream of audio-visual content generated in real-time based on interactions between the user devices. A recording trigger may be detected within the current communication session. A recording of a portion of the stream of audio-visual content may be recorded in response to the detected recording trigger. The recording may be analyzed to attribute one or more sub-portions within the recording to one or more of the user devices. At least one of the sub-portions attributed to an identified one of the user devices may be determined to meet parameters of a moderation event. A report regarding the identified user device may be generated that includes the at least one sub-portion determined to meet the parameters of the moderation event.

DETAILED DESCRIPTION

Embodiments of the present invention include systems and methods of intelligent reporting within online communities. A current communication session associated with a plurality of user device may be monitored. The current communication session may include a stream of audio-visual content generated in real-time based on interactions between the user devices. A recording trigger may be detected within the current communication session. A recording of a portion of the stream of audio-visual content may be recorded in response to the detected recording trigger. The recording may be analyzed to attribute one or more sub-portions within the recording to one or more of the user devices. At least one of the sub-portions attributed to an identified one of the user devices may be determined to meet a set of parameters defining a moderation event. A report regarding the identified user device may be generated that includes the at least one sub-portion identified as meeting the parameters of the moderation event.

Figure 1:
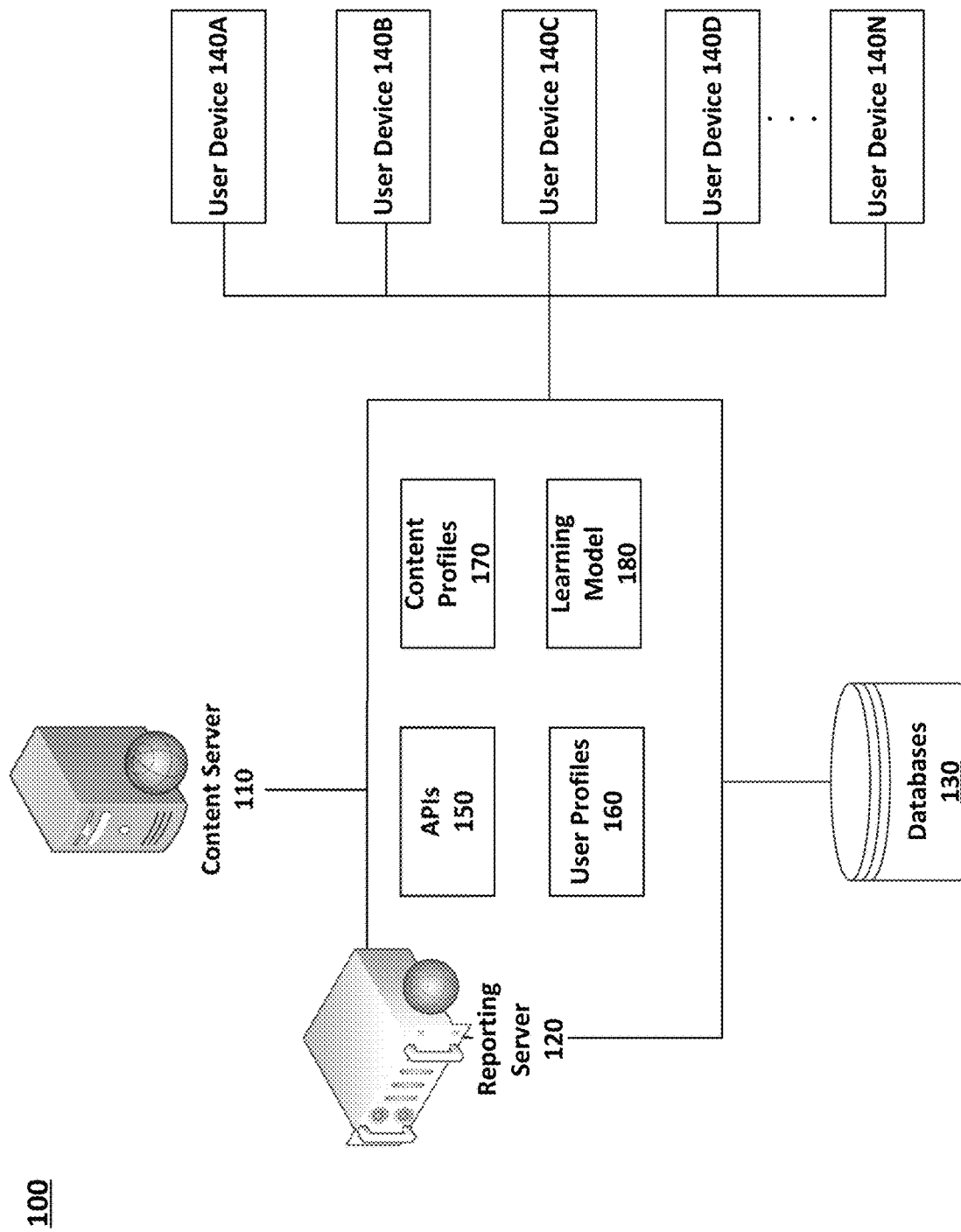
FIG. 1 illustrates a network environment in which a system for intelligent reporting within online communities may be implemented.

FIG. 1 illustrates a network environment 100 in which a system for intelligent reporting within online communities may be implemented. The network environment 100 may include one or more content servers 110 that provide digital content (e.g., games, other applications and services) for distribution, reporting server(s) 120, database(s) 130, and user devices 140A-D. The devices in network environment 100 may communicate with each other using one or more communication networks, which may include a local, proprietary network (e.g., an intranet) and/or may be a part of a larger wide-area network. The communications networks may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. One or more communications networks allow for communication between the various components of network environment 100.

The servers described herein may include any type of server as is known in the art, including standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

Content server 110 may maintain and provide a variety of digital content and digital services (e.g., corresponding to different game titles) available for distribution over a communication network. The content server 110 may be associated with any content provider that makes its content available for access over a communication network (e.g., streaming or download). The content servers 110 may therefore host a variety of different content titles, which may further have be associated with object data regarding a digital or virtual object (e.g., activity information, zone information, character information, player information, other game media or status information, etc.) displayed in a digital or virtual environment during an interactive session.

Such content may include not only digital video and games, but also other types of digital applications and services. Such applications and services may include any variety of different digital content and functionalities that may be provided to user devices 140, including providing and supporting chat and other communication channels. The chat and communication services may be inclusive of voice-based, text-based, and video-based messages. Thus, a user device 140 may participate in a gameplay session concurrent with one or more communication sessions, and the gameplay and associated communication sessions may be hosted on the same or different content servers 110.

Reporting server 120 may include any data server known in the art that is capable of communicating with the different content server(s 110, database(s) 130, and user devices 140. Reporting server 120 may be implemented on one or more cloud servers that carry out instructions associated with interactive content (e.g., games, activities, video, podcasts, user-generated content, publisher content, etc.). The reporting server 120 may further carry out instructions, for example, for monitoring one or more current interactive sessions and associated communication sessions with one or more user devices 140 associated with a user or users participating in the game and/or communication sessions. Specifically, the reporting server 120 may monitor and record one or more concurrent audiovisual streams (or portions thereof) of the current interactive session and associated communication sessions (e.g., taking place concurrent with the interactive session) in response to one or more recording triggers. The reporting server 120 may also analyze the recording to attribute different portions and sub-portions to different users, as well as flag when a particular portion or sub-portion appears to trigger a moderation rule.

In exemplary implementations, reporting server 120 may monitor a current communication session associated with a plurality of user device in real-time. The current communication session may be associated with a stream of audio-visual content generated in real-time based on interactions between the user devices. For example, the user devices 140 may be playing a multiplayer game title together in a current game session, and the users of user devices 140 may be communicating through one or more concurrent communication sessions (e.g., to coordinate team play, smack talk, socialize, etc.). The concurrent communication sessions may be supported by the same server that hosts the game title currently being played or may be supported by a separate server.

The reporting server 120 may detect a recording trigger within the current communication session, which indicates that a user of one of the user devices 140 in the session wishes to report a current interaction associated with one or more of the other users. The recording trigger may be a signal from the user device 140 of the reporting user, including specific button press(es) or other device input, gesture, designated wake word or other verbal command, or other input designated beforehand (e.g., by default or customized by the user) for triggering recording functions of the reporting server 120. For example, a specific controller button or combination of button presses may be designated as a quick button that generates a signal to trigger a save/capture function in relation to the stream(s) associated with the current session.

The reporting server 120 may therefore execute the recording function to capture a recording of a portion of the stream of audio-visual content in response to the detected recording trigger. The audiovisual content may include audiovisual content relating to the virtual environment of the game title being played, as well as any audiovisual content (e.g., voice, text, video chat) from concurrent communication channels. As real-time communications may occur faster than a user can trigger the recording, reporting server 120 may maintain a buffer that includes a portion of the current stream(s) corresponding to a time period immediately preceding detection of the recording trigger (e.g., 5-10 seconds, 5 minutes). The buffered portion may be included in the recording, along with a portion of the current stream(s) corresponding to a time period after detection of the recording trigger.

Reporting server 120 may analyze the recording to attribute one or more sub-portions within the recording to one or more of the user devices. For example, certain portions (within a frame or at a certain point within a timeline of the recording) may include audiovisual content associated with a specific user, including text or graphical content inputted into a chat, speech, real-world images or video of the user (e.g., from an associated video chat channel), and user-specific characters/avatars and their respective behaviors within the game environment. The captured recording may thus be determined to include different sub-portions, each associated with different users whose image, speech, and behaviors are determined to have been captured therein. Such determination may be based on user profiles (e.g., user profiles 160) that provide user data and/or learning models (e.g., learning models 180) trained to analyze audiovisual content and recognize patterns associated with different user images, user voices or speech patterns, and triggering behaviors. Each sub-portion of the recording may thus be assigned or identified as being associated with one or more users appearing, speaking, communicating, or otherwise controlling actions presented in the sub-portion of the recording.

The recording may further be analyzed by reporting server 102 to detect when at least one of the sub-portions attributed to an identified one of the user devices is determined to be a moderation event, which may be defined in relation to one or more sets of event parameters. Such event parameters may include audiovisual characteristics present in a portion of audiovisual content. Such audiovisual characteristics may include one or more keywords (e.g., text, audio sounds, and images or video of user speaking the same), graphics (e.g., imagery deemed to be offensive, obscene, violent, inappropriate for certain age groups), and behavioral (e.g., gestures, movements, character actions), etc., and stored in a content profile (e.g., content profiles 170). In some implementation, new moderation events may be defined based on learning models 180 trained to identify recurring patterns within reported audiovisual content streams or portions thereof. A user may also define a new moderation event exemplifying a new type of offensive behavior by specifying various parameters and identifying associated audiovisual content illustrative of the same, and a learning model 180 may be trained so as to be able to accurately detect and characterize the new moderation event. Certain combinations of parameters (e.g., speech, images, game data, and behavioral data) may also be defined as a type of moderation event by different content profiles 170, each of which may be specific to different age groups or other types of behaviors. For example, one content profile 170 may define moderation events indicating use of language, sharing of images, performing gestures, or controlling a character to act in ways that may be inappropriate for viewing or hearing by young children. Other moderation events may indicate content associated with harassing behaviors by a user of one of the user devices 140 participating in the current session. As such, the identified sub-portion(s) may be identified as featuring harassing behavior by one user in relation to another user within the recording.

The reporting server 120 may also generate a report regarding the user whose speech, communications, or behavior met a moderation event. The report may include the at least one sub-portion that meets the moderation event, as well as other contextual data, including other recording sub-portions, data regarding the reported user (e.g., historical data, profile data, historical reports regarding prior behaviors), and annotations by the reporting user making the report. The annotation data may be received from a user device 140 (associated with the recording trigger signal) of the reporting user, who may be provided with access to the recording within a graphic user interface presenting annotation options. The annotation data may be received synchronously or asynchronously from the recording. The reporting server 120 may, for example, receive annotation data during the recording of the sub-portion or may send a reminder (e.g., "do you want to continue reporting this?") to the reporting user at an end of a session or play period (e.g., end of a level) with a link to the report.

In some implementations, the report may include an extended recording with flagged sub-portions identified as meeting one or more moderation events. The reporting user may view the recording within the graphic user interface and further add verbal, textual, or video annotation input to provide contextual or explanatory information regarding the reported behavior. For example, the annotation input may include a voice memo captured in real-time or upon access of the recording afterwards. Annotation input may further be used to refine content profiles 170 and learning models 180 for new moderation events. For example, reporting server 120 may initially identify one or more different possible moderation events associated with portions or sub-portions of the recording. The graphic user interface presented to the reporting user may include a generate menu of one or more options corresponding to the different moderation events. The annotation input may be generated based on a selection from the menu of the applicable moderation event(s).

In some implementations, the reporting server 102 may send the recording to multiple users in the session for additional annotation or voting. Some users may be excluded if identified as being part of the flagged sub-portions (e.g., reported/offending user) or otherwise ineligible (e.g., underage child where the moderation event related to adult content) and thus restricted from accessing or viewing the recording. Where multiple users may receive the recording, one or more menus of options may be presented that permit for annotation or other information to be submitted in relation to the recorded behavior, including such questions or options as which specific behaviors are offensive, severity of behavior, whether to impose a punishment, severity of punishment to impose, etc. Different selections or votes from the set of the user devices may be tallied selections are included in the report sent to the designated moderator device. When indicated as complete, the reporting server 120 may send the report to a designated moderation device, which may store the report, take automated action based on the report (e.g., enact automated punishments to disincentivize the flagged behaviors or protections to prevent harm to other users), or escalate moderation.

While pictured separately, the databases 130 may be any type of memory or storage device known in the art. Databases 130 may be stored on any of the servers and devices illustrated in network environment 100 on the same server, on different servers, or in association with any of the user devices 140. Such databases 130 may also store or link to various stores for APIs 150, user profiles 160, content profiles 170, learning models 180, historical gameplay data, historical reports, etc., used for dynamic content analysis and report generation. A particular game title may be associated with different types of game data or metadata, which may also be provided in the report for context with respect to evaluating the behaviors presented within the recording. Such data may also be used to train learning models 180 to recognize new type of behaviors for moderation.

The user device 140A-D may include a plurality of different types of user devices known in the art. The user device 140 may be a computing device or system that may include any number of different gaming consoles, display devices, televisions, head-mounted display devices, virtual reality devices, handheld device, mobile devices, laptops, and desktops. Such user devices 140 may also be configured to access data from other storage media, such as, but not limited to memory cards or disk drives as may be appropriate in the case of downloadable or streaming content. Such user devices 140 may include standard hardware computing components such as, but not limited to network and media interfaces, non-transitory computer-readable storage (memory), and processors for executing instructions that may be stored in memory. These user devices 140 may also run using a variety of different operating systems (e.g., iOS, Android), applications or computing languages (e.g., C++, JavaScript). An exemplary user device 140 is described in detail herein with respect to FIG. 5. Each user device 140 may be associated with participants (e.g., players) or other types (e.g., spectators) of users in relation to a current interactive session.

User devices 140 may include a set of different types of user devices located in a real-world space (e.g., living room, family room, playroom, or other building space) associated with a particular user or set of users. User devices 140 may include, for example, any device (including smart device) capable of outputting and/or capturing audio or sound, as well as communicating with other user devices 140 via a communication network or other connection. As such, user devices 140 may include home theater devices, televisions, projectors, soundbars, device controllers, handheld devices, speakers and sub-woofers, headsets (including headphones, earphones, or other head- or ear-mounted speakers), other peripheral or accessory devices that may include associated audio output components, and microphones (which may be separate from or built into another user device). Some devices may include both microphones and audio output components (e.g., speakers). Thus, user devices 140 may also be inclusive of smart home devices, Internet of Things (IoT) devices, virtual assistant devices, baby and pet monitoring devices, etc.

As illustrated, reporting server 120 may further include API store 150, user profiles 160, and content profiles 170, and learning models 180. The digital content (e.g., from content source server 110, packaged by reporting server 120) may be provided to a particular user device 140 using one or more APIs in API store 150, which allows various types of devices in network environment 100 to communicate with each other. The APIs in API store 150 may be specific to the particular operating language, system, platform, protocols, etc., of the content server 110, as well as the user devices 140 and other devices of network environment 100. In a network environment 100 that includes multiple different types of content servers 110 and user devices 140, there may likewise be a corresponding number of APIs that allow for various formatting, conversion, and other cross-device and cross-platform communication processes for providing content and other services to different user devices 140, which may each respectively use different operating systems, protocols, etc., to process and render such content. As such, applications and services in different formats may be made available so as to be compatible with a variety of different user device 140. The API 150 may further include additional information, such as metadata, about the accessed content or service to the user device 140. As described below, the additional information (e.g., object data, metadata) can be usable to provide details about the content or service being provided to the user device 140. In some embodiments, the services provided from the content servers 110 to the user device 140 via the API may include supporting services that are associated with other content or services, such as chat services, ratings, and profiles that are associated with a particular game, team, community, etc. In such cases, the content servers 110 may also communicate with each other via one of the APIs in API store 150.

User profiles 160 may include any type of data regarding a user, including associated user devices, user accounts, historical gameplay, historical behavioral data, user images, user voice recordings, and other data that may be used to identify and analyze user actions and behaviors captured in a recording. In some implementations, reports and annotations may also be used to update user profiles and create a record or rapsheet as to prior offenses and flagged behaviors.

Content profiles 170 may include any type of data relating to reported content, including moderation event(s) used to flag, annotate, and generate reports as to the same. As discussed above, the parameters defining a moderation event may include any combination of user data, game data, speech data, behavioral data, etc., that may be used to analyze and characterize user behavior. For example, one content profile may define a moderation event pertaining to use of profanities or other adult language. Another content profile may define indicators of adult graphical or visual content, including violent, sexually explicit, scary, or other adult content. New content profiles 170 may continually be generated based on new audiovisual streams, user-generated content, reported content, etc., each of which may be associated with annotations or patterns of user reactions or feedback indicative of the type of moderation event.

Learning models 180 may be used to analyze portions or sub-portions of a recording in order to attribute which user(s) to attribute to each portion/sub-portion. A learning model 180 may be trained, for example, to recognize a particular user voice so as to disambiguate that particular voice from a conversation and determine the particular user made certain statements or sounds during a conversation. Different learning models 180 may thus be trained for different user voices. Similarly, different learning models 180 may be trained to recognize different types of offending behaviors to flag for reporting and moderation. Such learning models 180 may further use any available data regarding current conditions and other contexts for analyzing and interpreting a recording, including data regarding gameplay, user demographic data, user characteristics and behaviors, virtual objects, elements, events, gameplay trajectories and outcomes, etc. The learning models 180 may further correlate different sets of the identified behavioral data to different bases for moderation, which may thereafter be defined as moderation events.

Learning models 180 may be generated and refined using artificial intelligence and machine learning techniques (e.g., similar to those used by large language models trained using large data corpora to learn patterns and make predictions with complex data) on historical and current session data, as well as supplemental content data. Artificial intelligence and machine learning techniques may further be applied to train a learning model 180 for a particular user based on historical data, including game data, which may be captured during interactive sessions of the same or different (but similar) users and user devices. Such game data may include not only information regarding the game and other content titles being played, but also user profiles, chat communications (e.g., text, audio, video), captured speech or verbalizations, behavioral data, in-game events, actions, and behaviors, etc., associated with the interactive session and any concurrent or included communication session(s). The game data may be analyzed to determine whether a current behavior may be offensive, harassing, or otherwise unsuitable to one or more other users in the session. The reactions and comments by other users during the flagged behavior (e.g., which may be presented concurrent with a presentation of virtual environment during gameplay on another device), for example, may be used to refine future determinations as to whether the behavior is recurring, how to attribute the behavior to one or more users, how the behavior is classified and/or flagged in relation to one or more moderation events, etc.

In some implementations, historical reports or records relating to past behaviors by the user may be retrieved from local or remote databases and systems, social network systems, or other service providers. Such data may be used as bases for analyzing current behaviors by the user during and/or in association with a current interactive session. In addition, game data may be monitored and stored in memory as object or activity files, which may be used for supervised and unsupervised learning whereby a model may be trained to recognize patterns between certain game/user data and associated user behaviors, as well as to predict and flag potentially flaggable behaviors in recordings for use in reporting a particular user. In some implementations, sets of the object files or activity files may be labeled in accordance with any combination of game metadata and user feedback during or in association with the respective sessions. Such files may thereafter be used to train the learning models 180 to recognize certain user patterns and behavior patterns.

In exemplary embodiments, media files, object files, and activity files may provide information to learning models 180 regarding current session conditions, which may also be used for evaluating recordings and generating report data. learning models 180 may therefore use such files to identify specific conditions of the current session, including players, characters, and objects at specific locations and events in the virtual environment. Based on such files, for example, learning models 180 may identify that certain in-game behaviors in combination with real-world communications or behaviors as meeting a moderation event, which may be associated with the content title, virtual environment, virtual scene or in-game event (e.g., significant battles).

Different machine learning models 180 may be trained using different types of data input, which may be specific to the user, the user demographic, associated game or other interactive content title(s) and genres thereof, social contacts, behaviors, etc. Using the selected data inputs, therefore, the machine learning model 180 may be trained to attribute behaviors to particular users and to analyze the behaviors. Such learning models 180 may be updated based on new feedback or analytics of gameplay, behaviors, and user feedback. In that regard, the learning models 180 may not only be constructed for or customized to a particular user, but may be used for user groups that share similarities. Further, the system may affirm such associations or patterns by querying a player for feedback on whether the report correctly attributed, flagged, or characterized behaviors in the recording and utilize the user feedback to further update and refine the learning model 180, as well as monitoring associated or concurrent chat communications and sensor data regarding the user to discern positive or negative feedback as to such attributions, flags, and characterizations.

In exemplary implementations, reporting server 120 may generate an initial recording that may be analyzed to add flags, user attributions (and related metadata), automated annotations. The resulting report (including the recording and associated flags, etc.) may be presented to one or more users within a graphic user interface with tools that enable the addition of further flags, annotations, etc., in association with specific portions or sub-portions of the recording. For example, such tools may include markers for selecting different portions of a video or image frame, as well as portions within a duration of the recording. Automated menus of options may be presented for characterizing the flagged behavior (e.g., as abusive, grooming, or other inappropriate behavior) or confirming preliminary attributions and/or characterizations generated by reporting server 120. The finalized or confirmed report may be sent to a designated moderator device, which may include moderators associated with the game title, parent/guardian accounts associated with child accounts participating in session, or other designated recipients.

Figure 2:
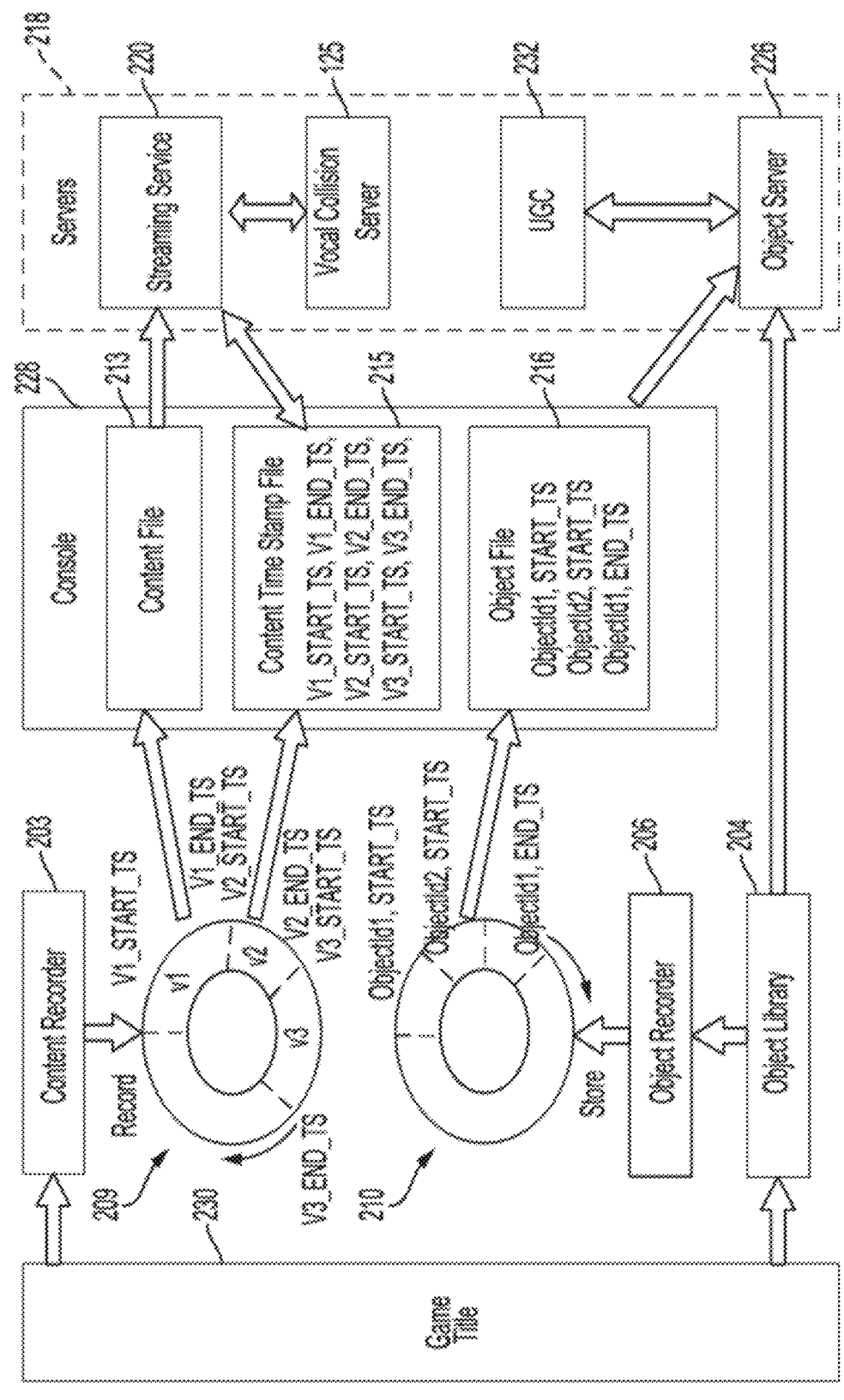
FIG. 2 illustrates an exemplary uniform data system (UDS) that may be used to provide data to a system for intelligent reporting within online communities.

FIG. 2 illustrates an exemplary uniform data system (UDS) that may be used to provide data to a system for intelligent reporting within online communities. Based on data provided by UDS 200, reporting server 120 can be made aware of the current session conditions, e.g., what in-game characters, objects, entities, activities, and events that users have engaged with, and thus support analysis of user behavior analysis and coordination of reporting by reporting server 120. Each user interaction may be associated the metadata for the type of in-game, chat, or real-world interaction, location within the in-game environment, and point in time within an in-game timeline, as well as other players, objects, entities, etc., involved. Thus, metadata can be tracked for any of the variety of user interactions that can occur in or during a game session, including associated communications, chats, activities, entities, settings, outcomes, actions, effects, locations, and character stats. Such data may further be aggregated, applied to data models 180, and subject to analytics. Such a UDS data may be used to assign contextual information to each portion of information in a unified way across games.

For example, various content titles may depict one or more objects (e.g., involved in in-game activities) with which a user can interact and/or UGC (e.g., screen shots, videos, commentary, mashups, etc.) created by peers, publishers of the media content titles and/or third party publishers. Such UGC may include metadata by which to search for such UGC. Such UGC may also include information about the media and/or peer. Such peer information may be derived from data gathered during peer interaction with an object of an interactive content title (e.g., a video game, interactive book, etc.) and may be "bound" to and stored with the UGC. Such binding enhances UGC as the UGC may deep link (e.g., directly launch) to an object, may provide for information about an object and/or a peer of the UGC, and/or may allow a user to interact with the UGC. The UGC itself may be used to train learning models 180 to recognize specific users and behaviors.

As illustrated in FIG. 2, an exemplary console 228 (e.g., a user device 130) and exemplary servers 218 (e.g., streaming server 220, an activity feed server 224, an user-generated content (UGC) server 232, and an object server 226) are shown. In one example, the console 228 may be implemented on the platform server 120, a cloud server, or on any of the servers 218. In an exemplary example, a content recorder 202 may be implemented on the platform server 120, a cloud server, or on any of the servers 218. Such content recorder 202 receives and records content (e.g., media) from an interactive content title 230 onto a content ring-buffer 208. Such ring-buffer 208 may store multiple content segments (e.g., v1, v2 and v3), start times for each segment (e.g., V1_START_TS, V2_START_TS, V3_START_TS), and end times for each segment (e.g., V1_END_TS, V2_END_TS, V3_END_TS). Such segments may be stored as a media file 212 (e.g., MP4, WebM, etc.) by the console 228. Such media file 212 may be uploaded to the streaming server 220 for storage and subsequent streaming or use, though the media file 212 may be stored on any server, a cloud server, any console 228, or any user device 130. Such start times and end times for each segment may be stored as a content time stamp file 214 by the console 228. Such content time stamp file 214 may also include a streaming ID, which matches a streaming ID of the media file 212, thereby associating the content time stamp file 214 to the media file 212. Such content time stamp file 214 may be uploaded and stored to the activity feed server 224 and/or the UGC server 232, though the content time stamp file 214 may be stored on any server, a cloud server, any console 228, or any user device 130.

Concurrent to the content recorder 202 receiving and recording content from the interactive content title 230, an object library 204 receives data from the interactive content title 230, and an object recorder 206 tracks the data to determine when an object beings and ends. The object library 204 and the object recorder 206 may be implemented on the platform server 120, a cloud server, or on any of the servers 218. When the object recorder 206 detects an object beginning, the object recorder 206 receives object data (e.g., if the object were an activity, user interaction with the activity, activity ID, activity start times, activity end times, activity results, activity types, etc.) from the object library 204 and records the activity data onto an object ring-buffer 210 (e.g., ActivityID1, START_TS; ActivityID2, START_TS; ActivityID3, START_TS). Such activity data recorded onto the object ring-buffer 210 may be stored in the object file 216. Such object file 216 may also include activity start times, activity end times, an activity ID, activity results, activity types (e.g., competitive match, quest, task, etc.), user or peer data related to the activity. For example, an object file 216 may store data regarding an item used during the activity. Such object file 216 may be stored on the object server 226, though the object file 216 may be stored on any server, a cloud server, any console 228, or any user device 130.

Such object data (e.g., the object file 216) may be associated with the content data (e.g., the media file 212 and/or the content time stamp file 214). In one example, the UGC server 232 stores and associates the content time stamp file 214 with the object file 216 based on a match between the streaming ID of the content time stamp file 214 and a corresponding activity ID of the object file 216. In another example, the object server 226 may store the object file 216 and may receive a query from the UGC server 232 for an object file 216. Such query may be executed by searching for an activity ID of an object file 216 that matches a streaming ID of a content time stamp file 214 transmitted with the query. In yet another example, a query of stored content time stamp files 214 may be executed by matching a start time and end time of a content time stamp file 214 with a start time and end time of a corresponding object file 216 transmitted with the query. Such object file 216 may also be associated with the matched content time stamp file 214 by the UGC server 232, though the association may be performed by any server, a cloud server, any console 228, or any user device 130. In another example, an object file 216 and a content time stamp file 214 may be associated by the console 228 during creation of each file 216, 214.

In exemplary embodiments, the media files 212 and activity files 216 may provide information to intent analytics server 140 regarding current session conditions, which may also be used as another basis for filtering the possible dialogue output options in accordance with likely intent in real-time. Intent analytics server 140 may therefore use such media files 212 and activity files 216 to identify specific conditions of the current session, including in-game events, objectives, other players, characters, and objects at specific locations. Based on such files 212 and 216, for example, reporting server 120 may identify a significance of the in-game event (e.g., character behaviors), which may be used to interpret user intent in combination with other communications by the user controlling the character. Such session conditions may drive how the communications and behaviors may be interpreted, thereby resulting in flagging, automated annotations, and other collections of data to present in conjunction with the recording within a report.

Figure 3:
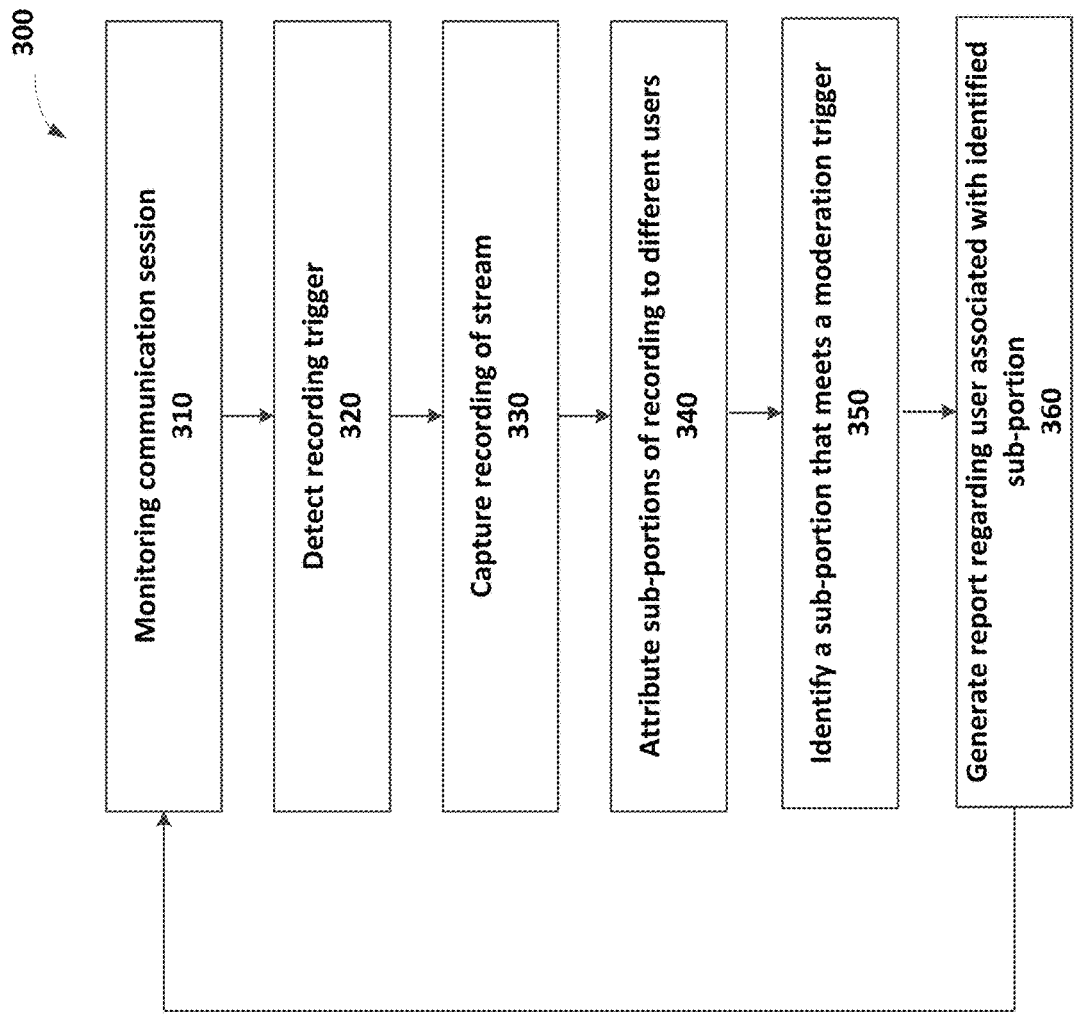
FIG. 3 is a flowchart illustrating an exemplary method of intelligent reporting within online communities.

FIG. 3 is a flowchart illustrating an exemplary method 300 of intelligent reporting within online communities. The method 300 of FIG. 3 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 3 (and the order thereof) are exemplary and may include various alternatives, equivalents, or derivations thereof including but not limited to the order of execution of the same.

In step 310, a current communication session and its audiovisual content may be monitored by reporting server 140 for any recording triggers. As each user may be allowed to initiate a report, reporting server 140 may monitor the communication session in real-time (or close to real-time) for any recording triggers from any of the user devices 140A-N participating in the communication session. Further, where the communication session is part of or associated with other sessions (e.g., gameplay sessions, other communication sessions), the reporting server 120 may also obtain media files 212 and activity files 216 regarding the gameplay session, as well as monitoring audiovisual streams associated with the other sessions. The media files 216 and activity files 216 may be used by reporting server 120 in conjunction with the conditions of the communication session to analyze the associated audiovisual content.

In step 320, a recording trigger may be detected. In some implementations, a user device 140 may be include a button designated as a quick button for generating a signal to trigger recording. Other user devices 140 may use a button combo press (e.g., specific combination of presses) to trigger recording. One or more microphones of a user device 140 may also be configured to capture and record audio in the real-world environment of the user and associated with the user device 150 (e.g., embedded in headphones, controllers, video cameras) where such audio may include a wake word or other command to trigger recording. Similarly, other ways of indicating commands (e.g., gesture) may be preconfigured and used to trigger a recording function either by the recording server 120 (or other devices under coordination by reporting server 120).

In step 330, reporting server 120 may capture a recording of the audiovisual stream associated with the current communication session and with any concurrent associated sessions. Such recording may include a portion (e.g., preceding 5-10 seconds) that was presented to the user devices 140 in the current session before the recording trigger was detected. In some implementations, the user device 140 that sent the recording trigger may also provide voice input for recording as a voice memo in real-time with the ongoing recording. Where multiple recording triggers may be received from different user devices 140 in the session, the reporting server 120 may coordinate with the user devices 140 to record voice memos from the respective users.

In step 340, different portions or sub-portions of the recording may be attributed to one or more users. For example, the recording may include a portion of the in-game audiovisual stream presenting an in-game event featuring one or more characters, each of which may be controlled by different user devices 140. In addition, the recording may include voice chat sounds, text chat messages, video chat images, etc., from one or more of the user devices 140. Any portion or sub-portion including content of or related to a particular user or set of users may be identified accordingly.

In step 350, a sub-portion of the recording may be identified as meeting the parameters of a moderation event, which may be defined by one or more content profiles 170. As discussed herein, the content profiles 170 may specify certain audiovisual characteristics indicating the presence of certain language or behavior, such as abusive, grooming, or other inappropriate behaviors. The use of the content profiles 170 may be tailored to the particular users participating in the current communication session. For example, where the current communication session may include a young child, different control profiles 180 may be used to monitor audiovisual content associated with the current communication session. Some users (or associated parent or guardian) may also request moderation in accordance with certain types of moderation events, each of which may be defined by different content profiles 170 and which learning models 180 may also be trained to continually refine for improved detection in subsequent iterations.

In step 360, a report may be generated that includes the identified sub-portion and any identified moderation events. The report may be sent to the user device 140 of a reporting user or other users for additional flags and/or annotations. For example, reporting server 120 may send the report to one or more user device(s) at an end of a play session or level with a reminder and link to the recording. The link may resolve to generate a graphic user interface that includes additional tools for adding flags to the recording and adding annotations. The report may also include one or more menus of options for characterizing and generating an outcome for the moderation event, such as a warning, punishment, and/or generation records related to the same. The selected options may be tallied and included in a finalized report sent to one or more recipient devices associated with moderators, parents/guardians, participants, and other designees. The method 300 may thereafter return to step 310 for further monitoring of the communication session.

Figure 4A:
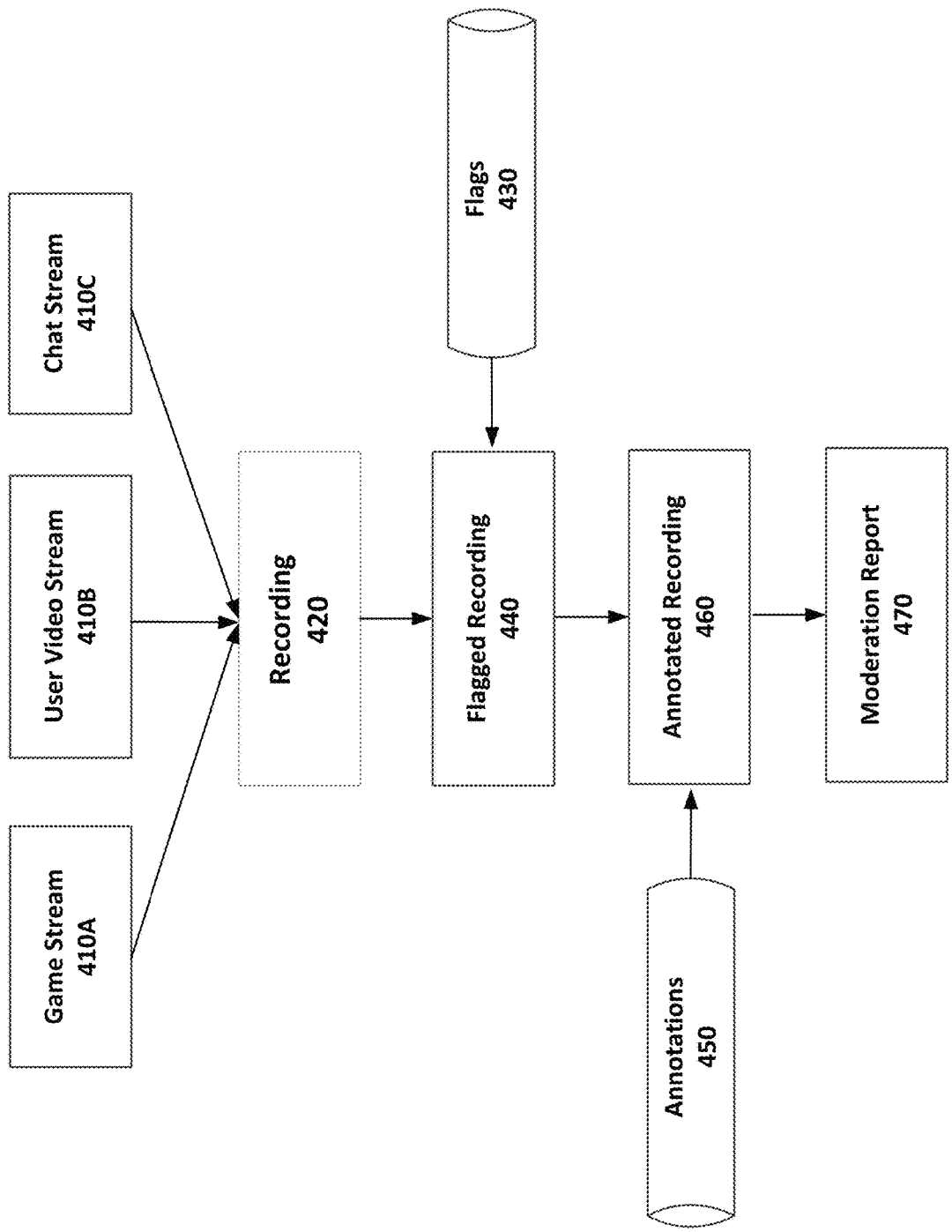
FIG. 4A is a diagram illustrating an exemplary implementation of intelligent reporting within online communities.

FIG. 4A is a diagram illustrating an exemplary implementation of intelligent reporting within online communities. As illustrated, multiple different streams 410A-C (e.g., associated with the same or different concurrent sessions hosted by the same or different servers) may be generated and provided to a set of user devices 140. The streams may include a game stream 410A, a user video stream 410B, and a chat stream 410C. The game stream 410A may include video of a virtual environment that is generated and streamed in real-time during gameplay or spectating by the user devices 140. The game stream 410A may therefore include real-time displays of 2in-game characters, environments, objects, and events. User video stream 410B may include video (e.g., of the user) in real-time and in real-world. Such video may be generated based on joining a video chat session concurrent with gameplay. Chat stream 410C may be inclusive of text-based chat, while also allowing for sharing and communication of images (e.g., emojis, GIFs, memes, etc.). As illustrated, the streams 410A-C may be ongoing simultaneously, whereby a user device 140A may engage with one or more of the other user devices 140B-N using different channels during a same period of time. Each individual stream 410 may therefore only provide partial context regarding engagement among the users during that period of time.

In exemplary implementations, reporting server 120 may record the multiple streams 410A-C into a single recording 420 or a set of associated recordings 420 (which may be synchronized or synchronizable). Reporting server 120 may begin recording based on detection of a recording trigger where a portion of buffered content immediately prior to the recording trigger may be included in the recording 420. The reporting server 120 may continue recording for a default or predetermined period of time or file size, until a command to end the recording is received, until an end of a session or level, or other end point.

The recording 420—which may be an audiovisual file or multiple synchronized audiovisual files—may be analyzed to automatically identify any moderation events. Such analysis may include identifying applicable moderation events, retrieving associate content profiles 170, and determining whether the parameters associated with the defined moderation events are present within the recording 420. The reporting server 120 may add one or more flags 430 to mark portions or sub-portions of the recording 420 associated with the identified moderation event and parameters thereof. In some implementations, users may also be allowed to add new flags or modify flags added by reporting server 120 (including removing flags). Each flag 430 may be a virtual bookmark associated with the portion/sub-portions and associated timestamps within the recording 420. The flag 430 allows for ease of retrieval of the referenced portion/sub-portions and navigation thereof, whereby a graphic user interface may be able to skip unflagged portions and present a flagged portion without having to present other portions. The addition of flags 430 to recording 420 results in generation of a flagged recording 440.

The recording 420 may also be annotated whereby annotations 450—such as descriptions, explanations, and other contextual information—may be added to the recording 420 in real-time or at a later time. The annotations 450 may be automatically added by reporting server 120 regarding such details as associated user(s) for each portion of the recording 420 or detected parameters of a moderation event. In addition, one or more users of the user devices 140 in the session(s) may also add or modify annotations 450 based on voice memos, text, selections identifying portions or sub-portions of the recording, and other input. The addition of annotations 450 to recording 420 results in generation of a annotated recording 450. Part or an entirety of the annotated recording 450 may be included, summarized, or linked to in a moderation report 470 generated by reporting server. The moderation report 470 may include the flags 430 and annotations 450, each of which may also be linked to the associated portion or sub-portion within the flagged 440 and/or annotated recording 460.

Figure 4B:
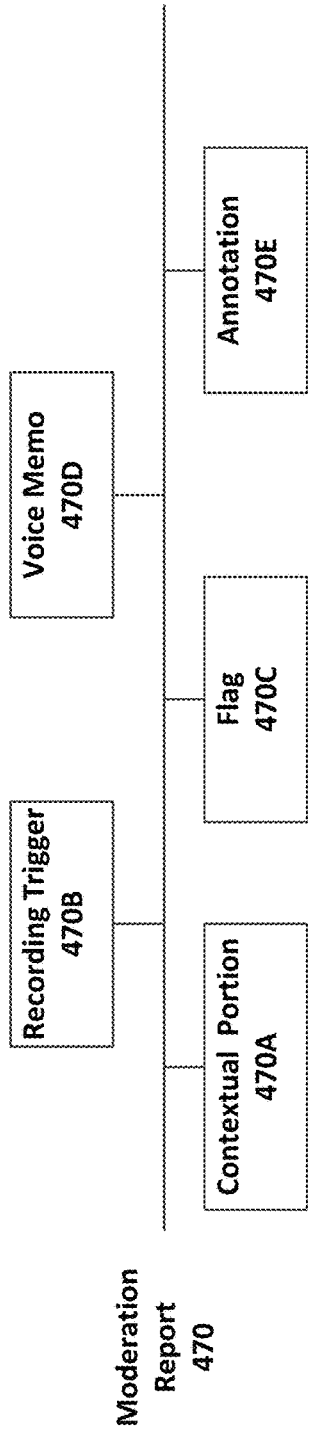
FIG. 4B is a diagram of an exemplary moderation report that may be generated.

FIG. 4B is a diagram of an exemplary moderation report 470 that may be generated. As illustrated, moderation report 470 may include multiple different portions 470A-E. As illustrated, a contextual portion 470A may be included in the moderation report 470. Such contextual portion 470A may correspond to a portion of the streams 410 that were buffered immediately before receipt of the recording trigger 470B. In addition, a flag 470C, voice memo 470D, and annotation 470E may also be included in the moderation report 470 and may each link to a corresponding portions of the flagged 440 and/or annotated recording 460.

Figure 4C:
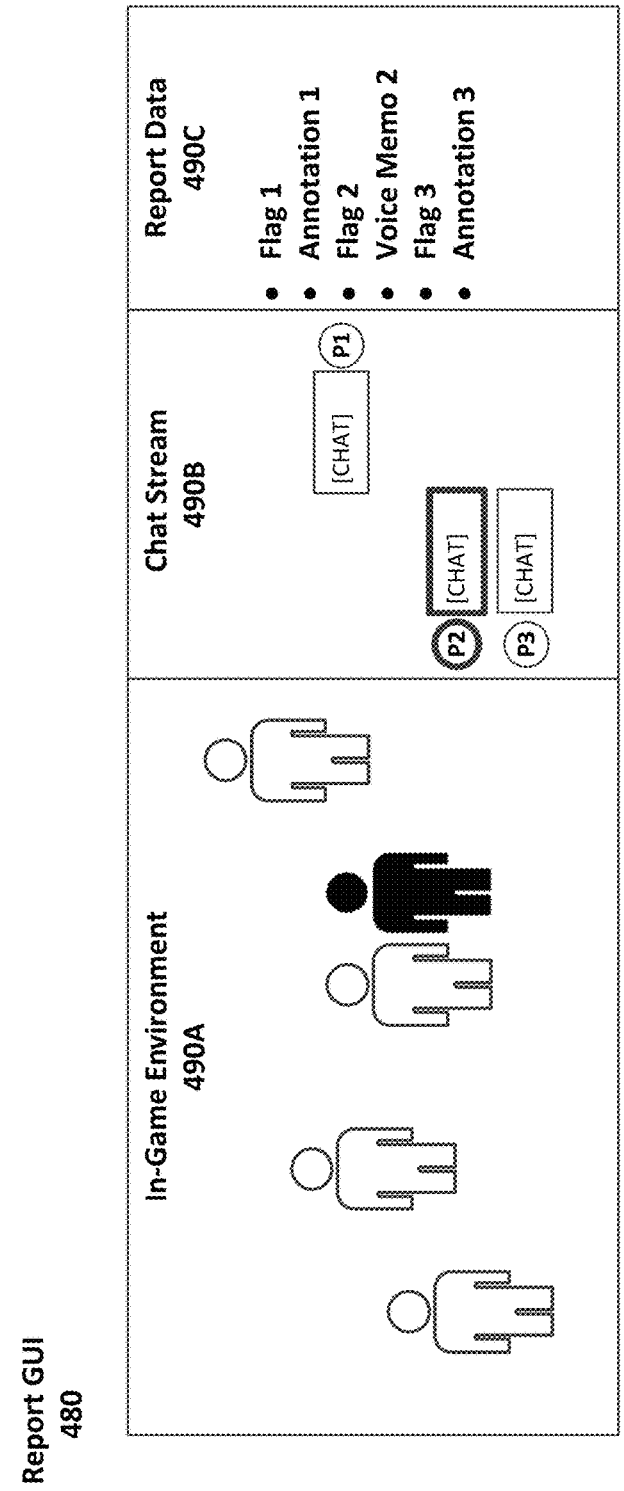
FIG. 4C illustrates an exemplary graphic user interface for presenting a moderation report.

FIG. 4C illustrates an exemplary report graphic user interface (GUI) 480 for presenting a moderation report. Such report GUI 480 may be generated at a device upon opening or linking to moderation report 470. Report GUI 480 may present a synchronized display of the recorded streams 410 for viewing by a reporting user (for further flagging and annotation) or a moderator. As illustrated, report GUI 480 may include multiple different sections. One section may include an in-game environment display 490A, which may correspond to a recorded portion of the game stream 410A. Another section may include a a chat stream display 490B, which may correspond to a recorded portion of the chat stream 410C captured concurrently with the recorded portion of the game stream 410A associated with in-game environment display 490A. Yet another section may include a report data display 490C, which may include any flags, annotations, and voice memos in the moderation report 470. As illustrated, the display of the game environment 490A may include a character whose appearance may be altered based on having been flagged (e.g., by reporting server 120 or by a user using flagging/annotation tools). Such alteration may include any kind of visual indicator that identifies the specific user or character associated with a flag or annotation. Such indicator may allow the user (e.g., reporting user or a designated moderator) to easily perceive which character or user and respective behaviors to evaluate for moderation purposes. Similarly, the chat stream display 490B may include certain messages that are marked for emphasis. Report data display 490C may provide the list of flags, annotations, and voice memos, each of which may be selectable to navigate to and display relevant contextual data regarding a different portion of moderation report 470.

Figure 5:
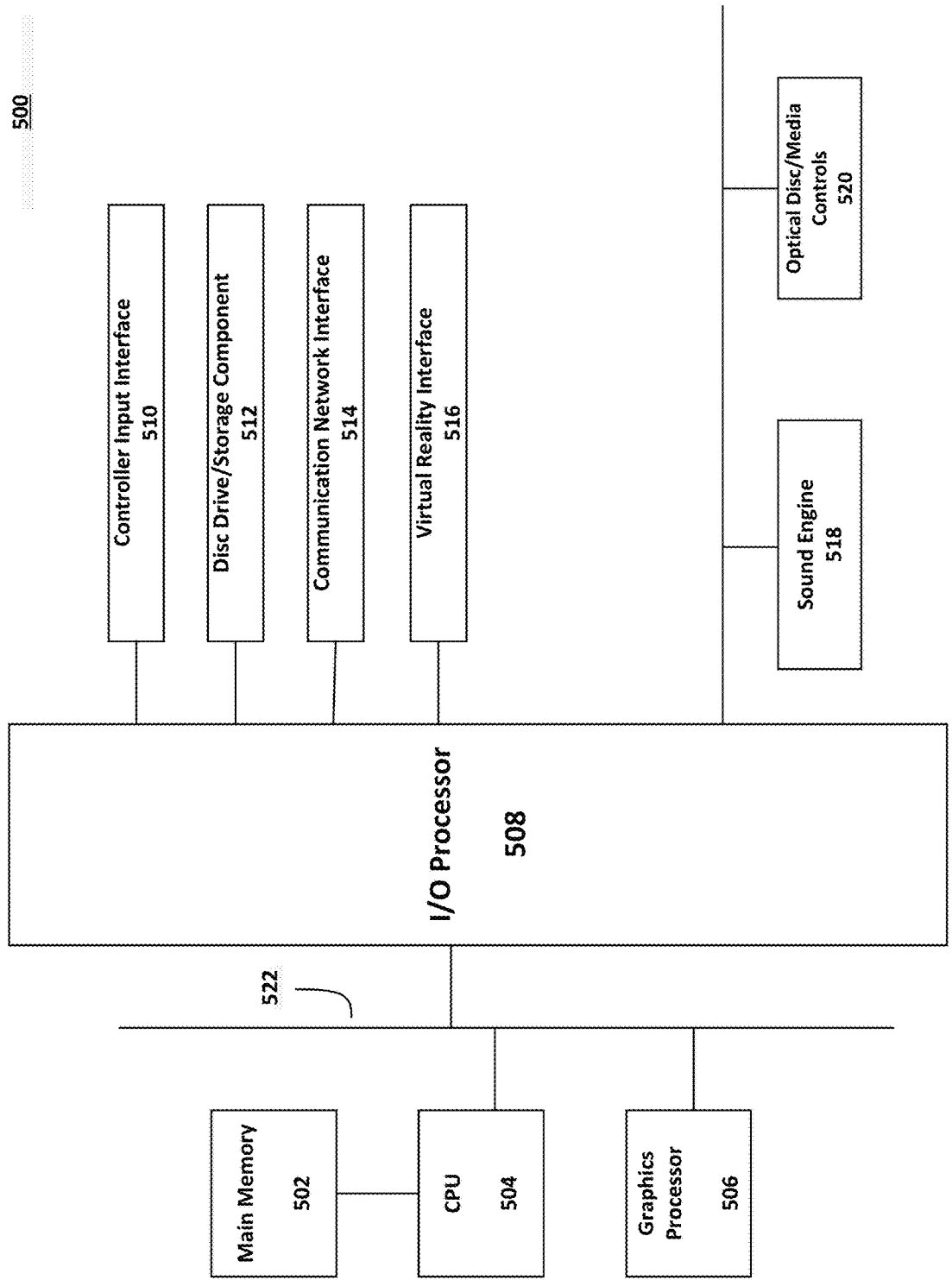
FIG. 5 is a block diagram of an exemplary electronic entertainment system that may be used in embodiments of the present invention.

FIG. 5 illustrates a block diagram of an exemplary electronic entertainment system 500 in accordance with an embodiment of the presently disclosed invention. The electronic entertainment system 500 as illustrated in FIG. 5 includes a main memory 502, a central processing unit (CPU) 504, graphic processor 506, an input/output (I/O) processor 508, a controller input interface 510, a hard disc drive or other storage component 512 (which may be removable), a communication network interface 514, a virtual reality interface 516, sound engine 518, and optical disc/media controls 520. Each of the foregoing are connected via one or more system buses 522.

Electronic entertainment system 500 as shown in FIG. 5 may be an electronic game console. The electronic entertainment system 500 may alternatively be implemented as a general-purpose computer, a set-top box, a hand-held game device, a tablet computing device, or a mobile computing device or phone. Electronic entertainment systems may contain some or all of the disclosed components depending on a particular form factor, purpose, or design.

Main memory 502 stores instructions and data for execution by CPU 504. Main memory 502 can store executable code when the electronic entertainment system 500 is in operation. Main memory 502 of FIG. 5 may communicate with CPU 504 via a dedicated bus. Main memory 502 may provide pre-stored programs in addition to programs transferred through the I/O processor 508 from hard disc drive/storage component 512, a DVD or other optical disc (not shown) using the optical disc/media controls 520, or as might be downloaded via communication network interface 514.

The graphics processor 506 of FIG. 5 (or graphics card) executes graphics instructions received from the CPU 504 to produce images for display on a display device (not shown). The graphics processor 506 of FIG. 5 may transform objects from three-dimensional coordinates to two-dimensional coordinates, and vice versa. Graphics processor 506 may use ray tracing to aid in the rendering of light and shadows in a game scene by simulating and tracking individual rays of light produced by a source. Graphics processor 506 may utilize fast boot and load times, 4K-8K resolution, and up to 120 FPS with 120 hz refresh rates. Graphics processor 506 may render or otherwise process images differently for a specific display device.

I/O processor 508 of FIG. 5 may also allow for the exchange of content over a wireless or other communications network (e.g., IEEE 802.x inclusive of Wi-Fi and Ethernet, 5G, 4G, LTE, and 5G mobile networks, and Bluetooth and short-range personal area networks). The I/O processor 508 of FIG. 5 primarily controls data exchanges between the various devices of the electronic entertainment system 500 including the CPU 504, the graphics processor 506, controller interface 510, hard disc drive/storage component 512, communication network interface 514, virtual reality interface 516, sound engine 518, and optical disc/media controls 520.

A user of the electronic entertainment system 500 of FIG. 5 provides instructions via a controller device communicatively coupled to the controller interface 510 to the CPU 504. A variety of different controllers may be used to receive the instructions, including handheld and sensor-based controllers (e.g., for capturing and interpreting eye-tracking-based, voice-based, and gestural commands). Controllers may receive instructions or input from the user, which may then be provided to controller interface 510 and then to CPU 504 for interpretation and execution. The instructions may further be used by the CPU 504 to control other components of electronic entertainment system 500. For example, the user may instruct the CPU 504 to store certain game information on the hard disc drive/storage component 512 or other non-transitory computer-readable storage media. A user may also instruct a character in a game to perform some specified action, which is rendered in conjunction with graphics processor 506, inclusive of audio interpreted by sound engine 518.

Hard disc drive/storage component 512 may include removable or non-removable non-volatile storage medium. Saud medium may be portable and inclusive of digital video disc, Blu-Ray, or USB coupled storage, to input and output data and code to and from the main memory 502. Software for implementing embodiments of the present invention may be stored on such a medium and input to the main memory via the hard disc drive/storage component 512. Software stored on hard disc drive 512 may also be managed by optical disk/media control 520 and/or communications network interface 514.

Communication network interface 514 may allow for communication via various communication networks, including local, proprietary networks and/or larger wide-area networks such as the Internet. The Internet is a broad network of interconnected computers and servers allowing for the transmission and exchange of Internet Protocol (IP) data between users connected through a network service provider. Examples of network service providers include public switched telephone networks, cable or fiber services, digital subscriber lines (DSL) or broadband, and satellite services. Communications network interface allows for communications and content to be exchanged between the various remote devices, including other electronic entertainment systems associated with other users and cloud-based databases, services and servers, and content hosting systems that might provide or facilitate game play and related content.

Virtual reality interface 516 allows for processing and rendering of virtual reality, augmented reality, and mixed reality data. This includes display devices such that might be partial or entirely immersive virtual environments. Virtual reality interface 516 may allow for exchange and presentation of immersive fields of view and foveated rendering in coordination with sounds processed by sound engine 518 and haptic feedback.

Sound engine 518 executes instructions to produce sound signals that are outputted to an audio device such as television speakers, controller speakers, stand-alone speakers, headphones or other head-mounted speakers. Different sets of sounds may be produced for each of the different sound output devices. This may include spatial or three-dimensional audio effects.

Optical disc/media controls 520 may be implemented with a magnetic disk drive or an optical disk drive for storing, managing, and controlling data and instructions for use by CPU 504. Optical disc/media controls 520 may be inclusive of system software (an operating system) for implementing embodiments of the present invention. That system may facilitate loading software into main memory 502.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method of intelligent reporting within online communities, the method comprising:
    monitoring a current communication session associated with a plurality of user devices, wherein the current communication session is associated with a stream of audio-visual content generated in real-time based on interactions between the plurality of user devices;
    detecting a recording trigger within the current communication session;
    capturing a recording of at least a portion of the stream of audio-visual content in response to the detected recording trigger;
    analyzing the recording to attribute one or more sub-portions of the recording of the at least a portion of the stream of audio-visual content to one or more user devices of the plurality of user devices free of a user input attributing the one or more sub-portions to an identified user device;
    determining at least one sub-portion of the one or more sub-portions attributed to the identified user device of the one or more user devices meets a moderation event; and
    generating a report regarding the identified user device, wherein the report includes the at least one sub-portion that meets the moderation event.

2. The method of claim 1, wherein the recording trigger is a signal from a signaling user device of the plurality of user devices in the current communication session, and further comprising making the report accessible to the signaling user device.

3. The method of claim 2, further comprising sending a reminder notification to the signaling user device at an end of the current communication session, wherein the reminder notification includes a link to the report.

4. The method of claim 1, further comprising flagging the sub-portions of the recording, and wherein the report includes the recording with the flagged sub-portions.

5. The method of claim 1, further comprising:
receiving annotation input from one of the user devices in the current communication session, the annotation input associated with one or more of the sub-portions within the recording;
adding the annotation input to the report; and
sending the report with the added annotation input to a designated moderator device.

6. The method of claim 5, wherein the annotation input includes a voice memo recording, wherein the voice memo recording is also recorded during the current communication session.

7. The method of claim 5, further comprising identifying one or more different possible moderation events associated with the report, and generating a menu of one or more options corresponding to different moderation events, wherein the annotation input corresponds to a selection from the menu.

8. The method of claim 7, wherein the annotation input corresponds to a plurality of selections from a set of the user devices, and further comprising tallying different selections from the set of the user devices, wherein the tallied selections are included in the report sent to the designated moderator device.

9. The method of claim 8, wherein the set of the user devices includes less than all of the user devices in the current communication session, and further comprising restricting access to the menu to the set of the user devices.

10. The method of claim 1, further comprising buffering the stream of audio-visual content generated in real-time, wherein the captured recording includes a predetermined portion of the buffered stream prior to detection of the recording trigger.

11. The method of claim 1, wherein attributing the sub-portions within the recording to one or more of the user devices is based on one or more learning models trained to disambiguate among different user voices of users of the user devices.

12. A system of intelligent reporting within online communities, the system comprising:
a communication interface that communicates over a communication network, wherein the communication interface establishes a current communication session associated with a plurality of user device, wherein the current communication session associated with a stream of audio-visual content generated in real-time based on interactions between the user devices;
a processor that executes instructions stored in memory, wherein the processor executes the instructions to:
monitor the current communication session,
detect a recording trigger within the current communication session;
capture a recording of at least a portion of the stream of audio-visual content in response to the detected recording trigger,
analyze the recording to attribute one or more sub-portions of the recording of the at least a portion of the stream of audio-visual content to one or more user devices of the plurality of user devices free of a user input attributing the one or more sub-portions to an identified user device,
determine at least one sub-portion of the one or more sub-portions attributed to the identified user device of the one or more user devices meets a moderation event, and
generate a report regarding the identified user device, wherein the report includes the at least one sub-portion that meets the moderation event; and
memory that stores the captured recording and the report.

13. The system of claim 12, wherein the recording trigger is a signal from a signaling user device of the plurality of user devices in the current communication session, and wherein the processor executes further instructions to make the report accessible to the signaling user device.

14. The system of claim 13, wherein the communication interface further sends a reminder notification to the signaling user device at an end of the current communication session, wherein the reminder notification includes a link to the report.

15. The system of claim 12, wherein the processor executes further instructions to flag the sub-portions of the recording, and wherein the report includes the recording with the flagged sub-portions.

16. The system of claim 12, wherein the communication interface further receives annotation input from one of the user devices in the current communication session, the annotation input associated with one or more of the sub-portions within the recording, wherein the processor executes further instructions to add the annotation input to the report; and the communication interface further sends the report with the annotation input to a designated moderator device.

17. The system of claim 16, wherein the annotation input includes a voice memo recording, wherein the voice memo recording is also recorded during the current communication network.

18. The system of claim 16, wherein the processor executes further instructions to identify one or more different possible moderation events associated with the report, and to generate a menu of one or more options corresponding to different moderation events, wherein the annotation input corresponds to a selection from the menu.

19. The system of claim 18, wherein the annotation input corresponds to a plurality of selections from a set of the user devices, and wherein the processor executes further instructions to tally different selections from the set of the user devices, wherein the tallied selections are included in the report sent to the designated moderator device.

20. The system of claim 19, wherein the set of the user devices includes less than all of the user devices in the current communication session, and wherein the processor executes further instructions to restrict access to the menu to the set of the user devices.

21. The system of claim 12, wherein the memory includes buffer memory that buffers the stream of audio-visual content generated in real-time, wherein the captured recording includes a predetermined portion of the buffered stream prior to detection of the recording trigger.

22. The system of claim 12, wherein the processor attributes the sub-portions within the recording to one or more of the user devices based on one or more learning models trained to disambiguate among different user voices of users of the user devices.

23. A non-transitory, computer-readable storage medium, having embodied thereon a program executable by a processor to perform a method for intelligent reporting within online communities, the method comprising:
monitoring a current communication session associated with a plurality of user device, wherein the current communication session is associated with a stream of audio-visual content generated in real-time based on interactions between the plurality of user devices;

detecting a recording trigger within the current communication session;

capturing a recording of at least a portion of the stream of audio-visual content in response to the detected recording trigger;

analyzing the recording to attribute one or more sub-portions of the recording of the at least a portion of the stream of audio-visual content to one or more user devices of the plurality of user devices free of a user input attributing the one or more sub-portions to an identified user device;

determining at least one sub-portion of the one or more sub-portions attributed to the identified user device of the one or more user devices meets a moderation event; and generating a report regarding the identified user device, wherein the report includes the at least one sub-portion that meets the moderation event.

* * * * *